H. DE OLANETA.
DRY CELL.
APPLICATION FILED SEPT. 2, 1919.
1,398,366.
Patented Nov. 29, 1921.
2 SHEETS—SHEET 1.
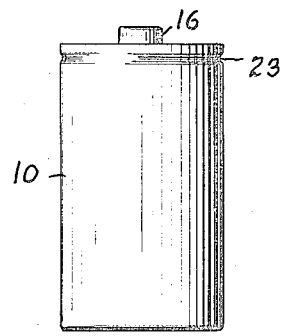
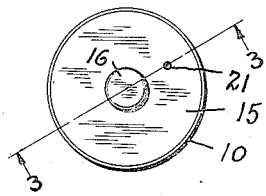
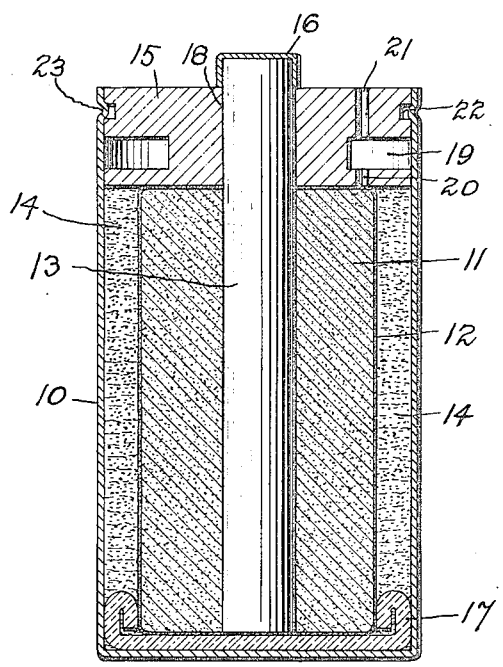
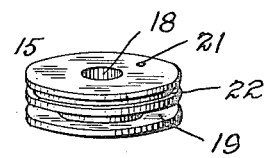
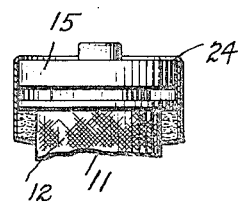
Inventor
Harold de Olaneta,
By
Attorney

H. DE OLANETA.
DRY CELL.
APPLICATION FILED SEPT. 2, 1919.

1,398,366.

Patented Nov. 29, 1921.
2 SHEETS—SHEET 2.

Inventor
Harold de Olaneta,
By
Attorney

UNITED STATES PATENT OFFICE.

HAROLD DE OLANETA, OF NEW HAVEN, CONNECTICUT, ASSIGNOR TO WINCHESTER REPEATING ARMS COMPANY, OF NEW HAVEN, CONNECTICUT, A CORPORATION OF CONNECTICUT.

DRY CELL.

1,398,366.  Specification of Letters Patent.  Patented Nov. 29, 1921.

Application filed September 2, 1919. Serial No. 321,068.

*To all whom it may concern:*

Be it known that I, HAROLD DE OLANETA, a citizen of the United States, residing in New Haven, New Haven county, Connecticut, have invented certain new and useful Improvements in Dry Cells, of which the following is a full, clear, and exact description.

This invention relates to dry cells for primary batteries and while not limited in its application to that purpose, it is primarily intended for employment in connection with small dry cells such as used for electric flash lights.

In cells of this character, it has been the common practice to place a suitable cartridge, containing a carbon electrode, in a zinc cup between which and the side of the cartridge an exciting paste is interposed; and the top of the cell thus formed has been closed in many cases by placing one or more paper washers on top of the cartridge and then pouring in sealing wax or other material while in a molten, plastic or liquid state, whereupon such material is permitted to set or harden. The materials for closing the upper end of the cell, and the form and construction of the upper portion of the cell, have frequently been the cause of serious drawbacks and disadvantages, deleteriously affecting the functioning and life of the cell. Where melted wax, for example, is used for a sealing medium, it is a difficult matter to prevent it from getting on the metallic cap of the projecting electrode, and if it sticks to such cap, it has to be scraped off. In hot weather the wax becomes soft and sticky. In cool weather, on the other hand, the sealing wax is very brittle so as to be easily broken and if the cell is accidentally dropped on the floor, it may not be capable of further service. Plaster of Paris also has this last mentioned drawback and there are similar difficulties incidental to the placing of the same in the cell.

Considerable difficulty has also been encountered heretofore as a result of the gas generated in the cell by electrolytic or thermal action. Gas is generated when the temperature is sufficiently high, regardless of whether or not the circuit of the battery is closed. If the gas is not disposed of in some satisfactory manner, it forces off the end closure or forces paste or other material out of the cell or otherwise damages the same.

The primary object of my invention is to overcome the above mentioned drawbacks, and to furnish a cell having a top closure of such character, form and arrangement that the efficiency of the cell is considerably increased, while at the same time deleterious gases are harmlessly disposed of and so the cell is more durable and is therefore calculated to have a longer life. By my improvements, also, the assemblage of the cell parts is simplified, increasing the facility and decreasing the cost of manufacture.

To these and other ends, the invention consists in the novel features and combinations of parts to be hereinafter described and claimed.

In the accompanying drawings,

Figure 1 is a side elevation of the dry cell embodying my improvements;

Fig. 2 is a top plan view thereof;

Fig. 3 is an enlarged section on line 3—3 of Fig. 2;

Fig. 4 is a detail perspective of the top closure member;

Fig. 5 is a fragmentary section showing a somewhat modified construction; and

Figure 6:
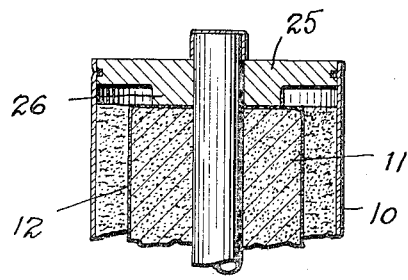

Figs. 6 to 11 inclusive show further modifications.

I have shown my improvements applied to a small dry cell of the type commonly used in connection with pocket flash lights. In its general features the cell comprises a drawn metal shell or cup 10, usually of zinc, forming one of the electrodes. Within the cup is a cartridge 11 of powdered carbon, graphite or the like, wrapped in a suitable envelop 12 which may consist of a piece of finely woven cloth. The envelop may be held on the cartridge by threads or other means which it is not necessary to illustrate. Within the cartridge 11 and projecting upwardly from the same to the exterior of the cell, is the usual central electrode 13 which may be constituted by a carbon rod. Interposed between the side of the cartridge and the inner face of the side wall of the cup is a suitable exciter 14. This is preferably constituted by a paste having the necessary ingredients, which may include for example ammonium chlorid as a primary exciting agent, and zinc chlorid or other deliquescent or hygroscopic salt which keeps the paste in a moist condition. In the upper end of the cup is a closure or plug 15, the novel features of which will be hereinafter described. The upper end of the carbon electrode 13 projects above the plug and is provided with the usual contact piece 16 which, in this instance, is illustrated as a cap, preferably of brass, fitting tightly over the end of the electrode. The lower end of the cartridge is centered in the cup by suitable means, such as a flanged disk 17, that may be made of paraffin-coated paper or the like; and the upper end of the cartridge is centered by means of the plug 15 which has a central opening 18, through which the electrode 13 passes with a snug fit.

The closure or plug 15 is of insulating material and is molded or otherwise made in the required shape prior to insertion in the cup, within the upper end of which it has a snug fit. The plug may consist, for example, of a molded or cut disk of rubber, suitably treated papier-mâché, fibrous or pulpy insulating composition, or the like. It is preferably made of a tough, non-brittle substance that is capable of withstanding considerable heat without melting. It should be less brittle than cold sealing wax or plaster of Paris and less susceptible than sealing wax to climatic changes, although I wish it to be distinctly understood that in some aspects of my invention as hereinafter described and claimed, it is not necessary for the plug to have all the characteristics noted.

The particular plug selected for illustration in Fig. 3 may be assumed to be of fibrous insulating composition molded or otherwise formed into disk shape. It is preferably fairly thick so that it may be provided, as hereinafter described, with a gas chamber or space of sufficient size communicating with the interior of the cup. In the form shown, the gas chamber 19 is provided at the periphery of the plug by forming therein an annular groove. In the example illustrated, this groove is fairly deep so as to present an annular gas chamber of considerable capacity having inner, upper and lower walls formed by the material of which the plug is composed, and an outer wall constituted by the side wall of the cup, which side wall fits snugly against the plug both above and below the groove so as to prevent escape of paste upward along the wall of the cup. I consider this an advantageous construction, but it will be obvious that the gas chamber may be differently formed and located.

Connecting the gas chamber 19 with the interior of the cell is a small duct 20, and by preference a vent from the gas chamber to the atmosphere is provided which may consist of a similar duct 21. In the example shown, the ducts 20 and 21 are in line with each other so that they may be formed by a single drilling operation but, of course, this is merely a matter of convenience. These ducts may be used where the paste employed is of a thick semi-solid character and they should obviously be of such small cross-sectional area as to prevent leakage of the paste. It is not necessary to interpose between the plug and the upper face of the cartridge any other part, and I have illustrated the lower face of the plug as being flat and lying in a single plane with its central part in contact with the upper face of the cartridge.

While the plug is preferably fitted tightly in the upper end of the cup so as to be held therein with a considerable amount of friction, additional means may be provided for preventing relative dislocation of the parts, and in the form shown the plug is secured to the cup by an interlocking connection. For this purpose the upper part of the plug above the gas chamber is provided with a small exterior annular groove 22 into which the metal of the cup wall is spun or crimped, as shown at 23. When the plug has been inserted into the cup in the proper position, the cup wall may be readily spun or crimped so as to bend a portion of the metal into the groove 22. In this manner an annular interlocking joint is provided which prevents relative longitudinal displacement of the cup and plug. This particular connection holds the plug against either inward or outward movement relatively to the shell, but the form of the connection may be considerably varied. In the modification shown in Fig. 5, for example, the extreme upper edge of the cup is slightly lapped over the upper face of the plug, as shown at 24, so as to prevent outward displacement of the plug. In this latter case, the cartridge interposed between the plug and the bottom of the cup is relied upon to prevent the plug from being forced inwardly, as well as the frictional contact between the edge of the plug and the cup.

It is manifestly not necessary in all cases to provide the plug with a vent leading from the gas chamber to the atmosphere and in case such a vent is used, it need not necessarily be in the location shown in the drawing.

The form of locking connection between the top closure and the cup wall may obviously be varied or modified as called for by conditions.

The end plug above described, constituting one of the many possible embodiments of the invention, is very durable and efficient, and in this particular instance the manufacture of the cell is very much simplified, owing to the fact that a closure member, formed of a single piece of material and which can be readily positioned in the cup, is recessed to provide a suitable gas chamber permitting the storage of gas when the cell is in use or when it is kept in a warm place. It will be understood, however, that it is not necessary in all aspects of the invention to make the plug in one piece, or to dispense with the use of one or more washers interposed between it and the cartridge, or to recess the plug for the creation of a gas chamber. Furthermore, if the plug is provided with a gas recess, the latter may obviously be formed or arranged in different ways.

In the modification shown in Fig. 6, for example, the plug is provided with a gas recess, but the latter is in direct communication with the interior of the cell. In this case the plug 25 consists of a disk having a central boss 26 on its lower surface which abuts against the top of the cartridge. In this instance, the gas recess in the plug, which is of annular shape, is formed by the boss extending downward from the main part of the disk. The boss serves as a means for holding the outer part of the disk at some distance above the top of the cartridge so as to provide a suitable gas chamber.

Figure 7:
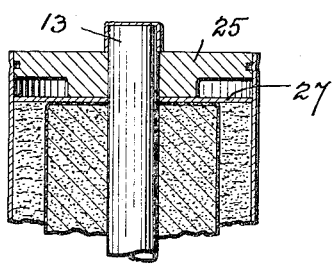

In Fig. 7, the construction is the same as that shown in Fig. 6, except that a washer 27 is interposed between the lower surface of the boss and the top of the cartridge. The washer 27, which has an opening by means of which it is centered on the electrode, may be in the form of a thin, flexible disk of paraffin-coated paper, or it may be a rigid washer of fibrous insulating composition, for example, of any desired thickness.

Figure 8:
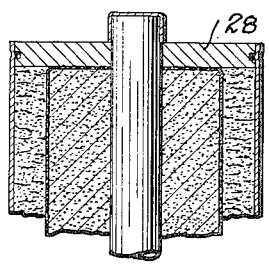

In the modification shown in Fig. 8, the end plug 28 consists simply of a flat, preformed disk with its lower surface abutting against the top of the cartridge. In this embodiment, there is no gas chamber, but the plug is shaped prior to insertion in the cup and is provided with an opening which fits tightly about the electrode and thereby centers the cartridge in the cup. The plug is also locked at its periphery to the wall of the cup by a suitable form of locking joint.

Figure 9:
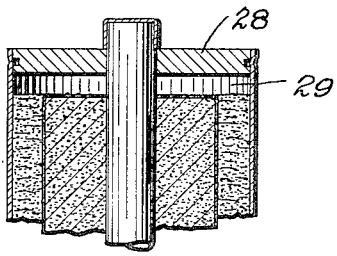

In the modification shown in Fig. 9, the plug 28 is the same as that shown in Fig. 8, but it is spaced upwardly from the cartridge so as to provide a gas chamber 29, which, in this instance extends inwardly from the wall of the cup to the electrode.

Figure 10:
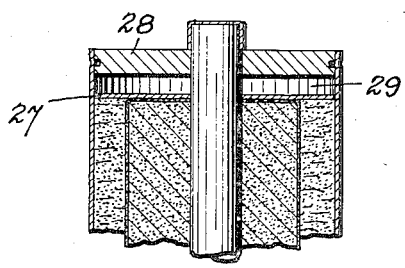

The modification shown in Fig. 10 is similar to that shown in Fig. 9, but a washer 27, similar to that shown in Fig. 7, is placed on top of the cartridge at some distance below the lower surface of the plug so as to form a bottom for the gas chamber.

Figure 11:
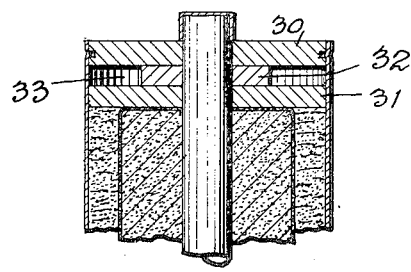

In the form shown in Fig. 11, the end plug is similar to that shown in Fig. 3, except that instead of being made of a single piece of material, it is made of three separate pieces, viz.: an upper layer 30, a lower layer 31 and an intermediate layer 32. Each of these layers is provided with a central opening for the electrode, and as the intermediate layer 32 is of less diameter than the others, a peripheral space 33 is provided for the storage of gas.

My invention is of particular advantage as applied to cells of the Leclanché type, as it provides a very convenient means for centering the carbon electrode pencil and its associated cartridge in the zinc cup at the upper part of the latter, so that the zinc will be acted upon in a uniform manner, while at the same time leakage of the paste and other solid matters from the top portion of the cell is prevented. The joint between the mouth portion of the sheet metal cup and the end plug is of such a character as to permit outward leakage of the gas while preventing escape of the paste. By my invention the assemblage of the different parts of the cell is greatly facilitated as compared with prior methods and the preformed end plug not only forms a tight joint with the carbon pencil and the zinc cup sealed against the leakage of anything except gas, but it also centers the pencil and cartridge, while at the same time the cartridge is held by the plug against vertical displacement in the cup. In the preferred form, also, provision is made for accommodating a certain amount of gas within the upper structure of the cell, as explained, although this is not necessary in all cases. Outward displacement of the pencil is prevented by its connection with the cartridge and by the snug fit of the pencil within the end plug.

Various other changes may be made in the details of the construction without departing from the scope of the invention as defined in the claims.

What I claim is:

1. A dry cell of the Leclanché type comprising a sheet metal cup, a cartridge therein of less height than the cup having an upwardly projecting carbon pencil as a part thereof, a body of paste interposed between the side surface of the cartridge and the side wall of the cup and extending approximately to the level of the upper cartridge surface, and a preformed end plug of suitable insulating material snugly fitted within the mouth portion of the cup and having an opening whereby it is fitted over the carbon pencil for centering the carbon pencil and cartridge in the cup as the end plug is inserted in the latter.

2. In a dry cell, a metallic cup, a cartridge therein provided with an electrode supported from the cup bottom, an exciting medium interposed between the cartridge and the cup wall, and a pre-formed end closure inserted within the cup end, and having an opening whereby it is fitted around and centers said electrode.

3. In a dry cell, a metallic cup, a cartridge therein having an upwardly projecting electrode, and a closure inserted into the cup by longitudinal thrust and formed prior to insertion therein, and having a lower surface adjacent the upper face of the cartridge, and an upper surface approximately flush with the upper end of the cup.

4. In a dry cell, a cup, a cartridge of less height than the cup, located therein and having an upwardly projecting electrode, an exciting paste interposed between the cartridge and the side wall of the cup, and a pre-formed plug of insulating material inserted into the cup by a longitudinal thrust, tightly fitted within the upper end portion of the cup and tightly fitted around the electrode, and extending substantially from the upper face of the cartridge to the upper end of the cup.

5. In a dry cell, a cup, a cartridge of less height than the cup located therein and having an upwardly projecting electrode, an exciting medium interposed between the cartridge and the side wall of the cup, and a preformed plug of insulating material frictionally fitted within the upper end portion of the cup around the electrode in substantial abutment with the upper face of the cartridge, and presenting an integral structure extending from the top of the cartridge substantially to the top of the cup, said plug having a gas chamber associated therewith.

6. In a dry cell, a thin metallic cup, a cartridge therein of less height than the cup, having an upwardly projecting electrode, and a thick, tough, preformed plug inserted in the upper end of the cup by a longitudinal thrust around the end of the electrode to center the latter, said plug being constructed and arranged to provide a gas chamber in the cell, and means for locking the plug in the cup.

7. In a dry cell, a closure made from a single piece of material and presenting a gas chamber.

8. In a dry cell, an end plug made of a single piece of material and presenting a peripheral gas chamber.

9. A dry cell of the Leclanché type having a sheet metal cup, a cartridge therein of less height than the cup having an upwardly projecting carbon pencil as a part thereof, a body of paste interposed between the side surface of the cartridge and the side wall of the cup and extending approximately to the level of the upper cartridge surface, and a preformed end plug of suitable insulating material snugly fitted within the mouth portion of the cup and having an opening adapted to center the carbon pencil and cartridge, the joints between the end plug and pencil and between the cup and end plug being so constructed as to prevent leakage of paste.

10. A dry cell of the Leclanché type having a sheet metal cup, a cartridge therein of less height than the cup having an upwardly projecting carbon pencil as a part thereof, a body of paste interposed between the side surface of the cartridge and the side wall of the cup and extending approximately to the level of the upper cartridge surface, and a preformed end plug of suitable insulating material snugly fitted within the mouth portion of the cup and having an opening adapted to center the carbon pencil and cartridge, the joints between the end plug and pencil and between the cup and end plug being so constructed as to prevent leakage of paste, and said end plug being so positioned relatively to said cartridge as to prevent vertical displacement of the latter in the cup as well as lateral displacement.

11. In a dry cell of the Leclanché type, a cup of sheet zinc, a cartridge therein of less height than the cup having an upwardly projecting carbon pencil, said cartridge being supported on the cup bottom, means for centering the cartridge in the lower portion of the cup, a body of paste interposed between the side surface of the cartridge and the side wall of the cup, a preformed end plug of suitable insulating material having a central opening for the carbon pencil, said plug being inserted snugly within the mouth portion of the cup so as to center the pencil therein and thereby the upper portion of the cartridge.

12. In a dry cell of the Leclanché type, a cup of sheet zinc, a cartridge therein of less height than the cup having an upwardly projecting carbon pencil, said cartridge being supported on the cup bottom, means for centering the cartridge in the lower portion of the cup, a body of paste interposed between the side surface of the cartridge and the side wall of the cup, a preformed end plug of suitable insulating material having a central opening for the carbon pencil, said plug being inserted snugly within the mouth portion of the cup so as to center the pencil therein and thereby the upper portion of the cartridge, said end plug being so constructed and arranged as to provide a gas chamber in the upper portion of the cell above the paste.

13. In a dry cell of the Leclanché type, a cup of sheet zinc, a cartridge therein of less height than the cup having an upwardly projecting carbon pencil, said cartridge being supported on the cup bottom, means for centering the cartridge in the lower portion of the cup, a body of paste interposed between the side surface of the cartridge and the side wall of the cup, a preformed end plug of suitable insulating material having a central opening for the carbon pencil, said plug being inserted snugly within the mouth portion of the cup so as to center the pencil therein and thereby the upper portion of the cartridge, there being a spun joint between the mouth portion of the cup, and the periphery of the end plug, which prevents inward and outward displacement of the plug and leakage of paste.

14. In a dry cell, a preformed one-piece end plug presenting in its structure a gas chamber.

15. In a dry cell, a preformed top closure peripherally recessed to provide space for gas generated in the cell.

16. In a dry cell, a cup, a cartridge therein, and a preformed closure fitted in the upper end of the cup and having a peripheral recess closed at its outer part by the side wall of the cup, said recess being in communication with the interior of the cell.

17. In a dry cell, a plug having a gas chamber, and provided with a duct leading from the lower face of the plug to the gas chamber.

18. A dry cell of the Leclanché type, comprising a sheet metal cup, a cartridge therein having an upwardly projecting carbon pencil, a body of paste interposed between the cartridge and the side wall of the cup, and a cup closure member of suitable insulating material inserted within the mouth portion of the cup and having an opening whereby it centers the carbon pencil and cartridge in the cup as said closure member is so inserted.

19. A dry cell of the Leclanché type, comprising a sheet metal cup, a cartridge therein having an upwardly projecting carbon pencil as a part thereof, a body of paste interposed between the cartridge and the side wall of the cup, and an end closure for the cup comprising a preformed disklike member of suitable insulating material adapted for insertion within the mouth portion of the cup, and having an opening which fits over the carbon pencil and through which the latter projects for centering the carbon pencil and cartridge in the cup as said member is placed in the latter.

20. In a dry cell, a one-piece end plug having a gas chamber with a vent duct to the atmosphere.

21. In a dry cell, an end plug made from a single piece of material, and having a gas chamber at its outer part, said gas chamber having associated therewith a vent duct leading through the plug to the upper surface of the latter.

22. A dry cell of the Leclanché type comprising a sheet metal cup, a cartridge therein having an upwardly projecting carbon pencil as a part thereof, a body of paste interposed between the cartridge and the side wall of the cup, and a plug of suitable insulating material snugly fitted within the mouth portion of the cup for closing the same and completely formed prior to insertion within the cup, said plug being adapted to center the carbon pencil and cartridge within the cup.

23. In a dry cell, a sheet metal cup, and a preformed end closure member with which the cup is interlocked by bending of the cup wall.

24. In a dry cell, a sheet metal cup, and a preformed plug therein, the cup wall and plug being formed to create a joint whereby they are interlocked.

25. In a dry cell of the Leclanché type, a sheet metal cup, a cartridge therein having an upwardly projecting pencil, a body of paste interposed between the cartridge and the side wall of the cup, and an end closure member for the cup snugly fitted within the mouth portion thereof and completely formed prior to insertion within the cup, and having a central opening for centering the carbon pencil and cartridge, as such member is placed in position within the cup, said member being so positioned as to prevent outward movement of the cartridge, and the joints between said member and the pencil on one hand and between said member and the cup on the other hand being constructed so as to prevent leakage of paste.

26. In a dry cell of the Leclanché type, a sheet metal cup, a cartridge therein having an upwardly projecting pencil, a body of paste interposed between the cartridge and the side wall of the cup, and an end closure member for the cup snugly fitted within the mouth portion thereof and completely formed prior to insertion within the cup, and having a central opening for centering the carbon pencil and cartridge, as such member is placed in position within the cup, said member being so positioned as to prevent outward movement of the cartridge, and the joints between said member and the pencil on one hand and between said member and the cup on the other hand being constructed so as to prevent leakage of paste, said closure member being so constructed and arranged as to present a gas space above and in communication with the paste space.

27. In a dry cell, a sheet metal cup, and a plug within the upper end of the cup, having a peripheral recess, the metal of the cup wall being crimped in said recess to prevent inward and outward displacement of the plug.

28. A dry cell of the Leclanché type, comprising a sheet metal cup, a cartridge therein having an upwardly projecting pencil, a body of paste interposed between the cartridge and the side wall of the cup, a preformed end plug of suitable insulating material snugly fitted within the mouth portion of the cup and having an opening through which the pencil projects for centering the pencil and cartridge in the cup as the end plug is placed in position, there being a spun joint between the mouth portion of the cup and the periphery of the end plug.

29. In a dry cell, a plug having a locking recess and a gas-receiving recess.

30. In a dry cell, a plug having a locking groove and a gas-receiving groove.

31. A dry cell of the Leclanché type, comprising a sheet metal cup, a cartridge therein having an upwardly projecting pencil, a body of paste interposed between the cartridge and the side wall of the cup, means within the lower portion of the cup for centering the cartridge therein, and an end closure member for centering the pencil and cartridge in the cup at the upper portion of the latter and preventing leakage of paste, said end closure member being completely formed prior to insertion in the cup and having an opening through which the pencil projects for centering the pencil and cartridge in the cup as said plug is inserted, said plug being positioned to prevent outward movement of the cartridge and having its upper surface substantially flush with the top of the cup.

In witness whereof, I have hereunto set my hand on the 29th day of August, 1919.

HAROLD DE OLANETA.